United States Patent
Gregel et al.

(10) Patent No.: US 6,532,711 B2
(45) Date of Patent: Mar. 18, 2003

(54) REINFORCING BAR SPLICE AND METHOD

(75) Inventors: John J. Gregel, Bedford, OH (US); Louis J. Colarusso, Macedonia, OH (US)

(73) Assignee: Erico International Corporation, Solon, OH (US)

( * ) Notice: Subject to any disclaimer, the term of this patent is extended or adjusted under 35 U.S.C. 154(b) by 0 days.

(21) Appl. No.: 10/068,412

(22) Filed: Feb. 6, 2002

(65) Prior Publication Data

US 2002/0104286 A1 Aug. 8, 2002

Related U.S. Application Data

(60) Provisional application No. 60/267,163, filed on Feb. 7, 2001.

(51) Int. Cl.[7] .............................. E04B 2/00; E04C 3/30; E04H 12/00
(52) U.S. Cl. .................... 52/583.1; 52/584.1; 52/726.1; 52/740.1; 52/649.1; 403/361; 403/362; 403/365
(58) Field of Search ................................ 52/583.1, 584.1, 52/726.1, 740.1, 649.1; 403/306, 267, 361, 362, 363, 364, 365, 370

(56) References Cited

U.S. PATENT DOCUMENTS

| | | | |
|---|---|---|---|
| 3,552,787 A | | 1/1971 | Yee |
| 3,679,250 A | * | 7/1972 | Marsden ..................... 403/313 |
| 3,694,012 A | * | 9/1972 | Gelfand ..................... 403/306 |
| 4,114,344 A | * | 9/1978 | Heasman ..................... 403/27 |
| 4,314,771 A | * | 2/1982 | Lambert ..................... 16/429 |
| 4,619,096 A | * | 10/1986 | Lancelot, III ................ 52/600 |
| 5,542,785 A | * | 8/1996 | Cloud ........................ 249/83 |
| 5,732,525 A | * | 3/1998 | Mochizuki et al. ......... 403/269 |
| 5,909,980 A | * | 6/1999 | Holdsworth ................. 403/265 |
| 5,974,761 A | * | 11/1999 | Mochizuki et al. ......... 403/267 |
| 6,202,282 B1 | * | 3/2001 | Holdsworth ................. 29/456 |
| 6,244,014 B1 | * | 6/2001 | Barmakian ................. 52/736.3 |
| 6,265,065 B1 | * | 7/2001 | McCallion ................ 174/35 R |

FOREIGN PATENT DOCUMENTS

| | | | |
|---|---|---|---|
| DE | 2 063 438 | | 6/1972 |
| GB | 1 264 604 | | 2/1972 |
| SU | 478101 | * | 8/1975 |
| WO | WO 81/02438 | * | 9/1981 |

* cited by examiner

*Primary Examiner*—Carl D. Friedman
*Assistant Examiner*—Kevin McDermott
(74) *Attorney, Agent, or Firm*—Renner, Otto, Boisselle & Sklar, LLP

(57) ABSTRACT

A bar connection or splice and method uses a cage of relatively short bars which may be smaller reinforcing bars or threaded bars or rods. The bars of the cage may be joined by rings or wires and clamped to bridge or lap aligned bar ends. In one form, the concrete may be cast directly around to cage and bar ends to form the equivalent of a butt joined lap splice. In an enhanced form, the cage is included in a sleeve and set screws clamp the bars, cage and sleeve together. The sleeve may be filled with a hardenable matrix such as resin or grout, and then concrete is cast around the connection. The number of sets screws and bars of the cage may vary widely to form vertical and horizontal splices of axially aligned bar of the same or transitional sizes.

74 Claims, 4 Drawing Sheets

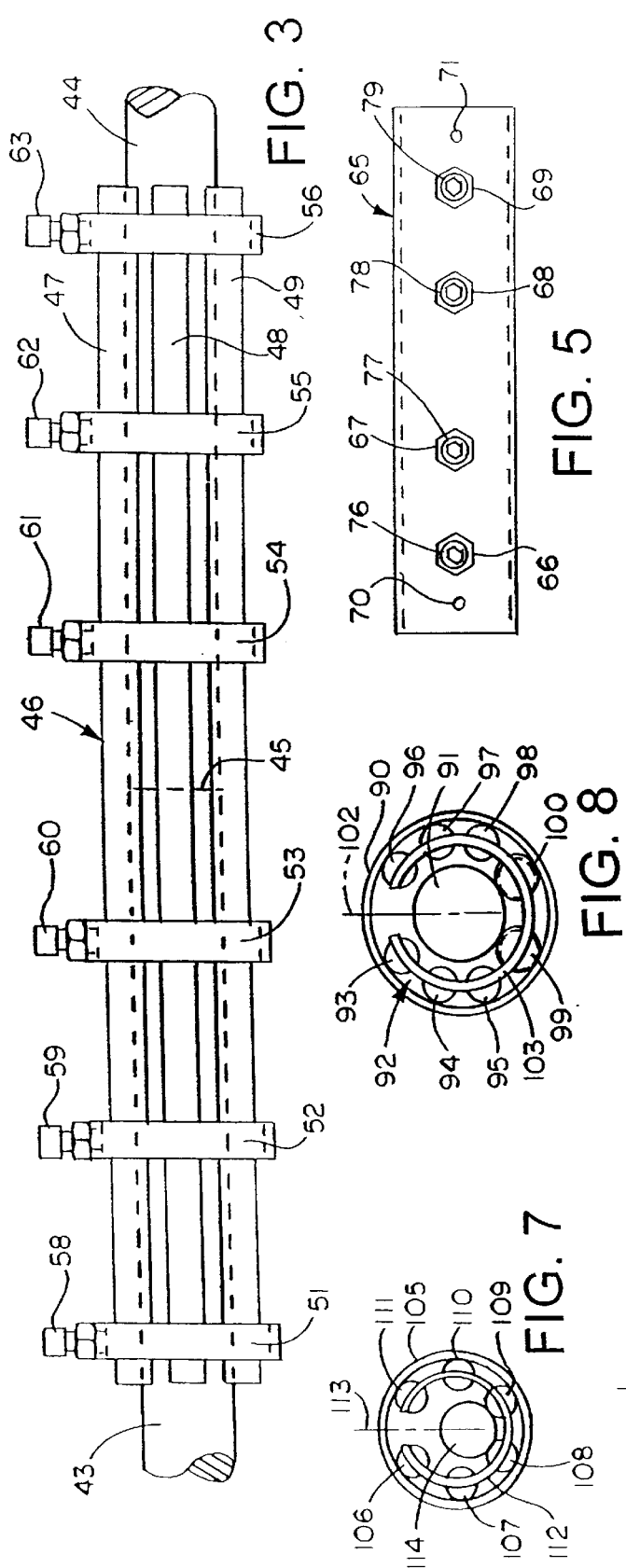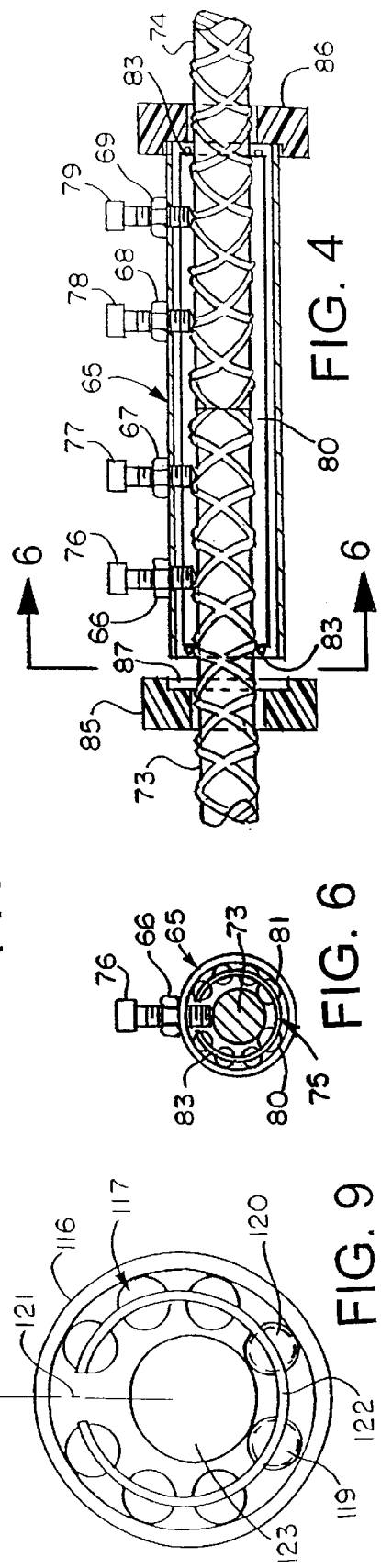

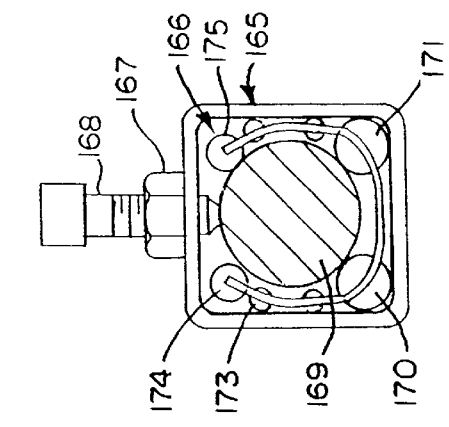
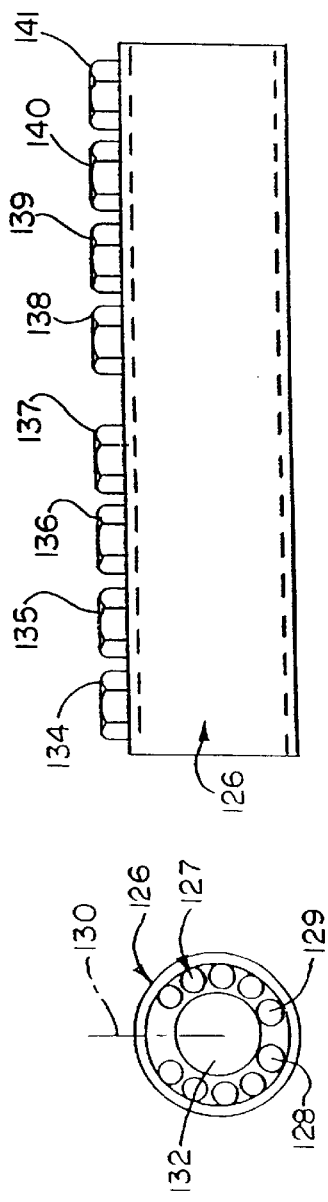
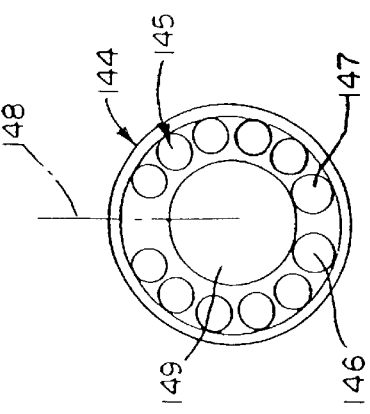
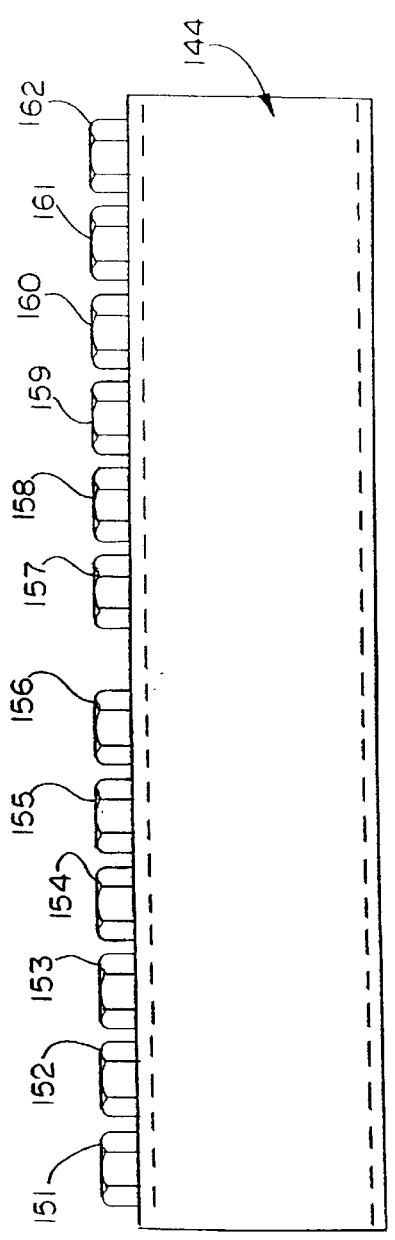

REINFORCING BAR SPLICE AND METHOD

This application claims the benefit of U.S. Provisional Application No. 60/267,163, filed on Feb. 7, 2001.

TECHNICAL FIELD

This invention relates generally as indicated to a reinforcing bar splice and method, and more particularly to a low cost concrete reinforcing bar splice for use in steel reinforced concrete construction. The splice is designed to be cost competitive to a conventional lap splice, yet providing a substantially superior splice both in tensile and compressive strength and dynamic or fatigue strength capabilities.

BACKGROUND OF THE INVENTION

In steel reinforced concrete construction, there are generally three types of bar splices employed. There are lap splices, mechanical splices, and welding. Each has advantages and disadvantages. Perhaps the lowest cost and most commonly used splice is the lap splice. The lap splice is normally formed by overlapping bar ends to be joined and wire-tying the side-by-side overlapped ends to each other. Some lap splices are formed with the bars laterally spaced. The extent of the side-by-side overlap may be substantial, requiring additional significant reinforcing steel. Also since the bars are axially offset, any load whether compressive or tensile is going to be eccentric. Lap splices also create forming and design problems because the axes of the joined bar are offset. For the same size bar, the joint will be at least as wide as two overall diameters of the bars, which are greater than the nominal diameters of the bars. Each bar is then at a different lateral spacing from the form. Thus, in order to obtain minimum concrete cover for the beam, slab, or column, for example, the form size and structure may be larger than it needs to be. It would accordingly be desirable if a low cost easily installed equivalent of a lap splice joint could be formed where the bars joined are axially aligned end-to-end.

It would also be desirable to be able to enhance the splice not just effectively to correct the disadvantages of lap splices, but also to provide a splice having superior strength characteristics in both compression and tension, but which will also meet dynamic or fatigue requirements to be a Type 2 coupler or splice where use is permitted in any of the four (4) earthquake zones of the United States. It would of course be desirable to enhance the splice without additional significant cost and without preparation or treatment of the joined bar ends such as with an upset or threaded ends found in many mechanical splices.

SUMMARY OF THE INVENTION

A bar splice for steel reinforced concrete construction utilizes a cage of relatively short reinforcing bars which may be of smaller size than the bars to be joined. The bars of the cage are secured together and arranged in a circular cylindrical fashion with an axial center opening designed to receive the axially aligned bar ends to be joined. The bars of the cage may be joined in a parallel circumferentially spaced cylinder by one or more rings or wires, and the cage is clamped to the bar ends by clamp or set screws threaded in nuts secured to the rings. The bar end is clamped between the set or clamp screw tips and the opposite side of the cage. The splice may be used for both horizontal and vertical or column joints. When the concrete is poured it embeds the cage and axially aligned bar ends, locking the bars axially end-to-end.

In a modified or enhanced version of the splice, the cage is enclosed in a sleeve and the set or clamp screws are threaded through nuts or nut bars on the sleeve to clamp the bar ends against the inside of the cage which bridges or laps the bar ends within the sleeve. Before concrete is cast around the joint, the sleeve is filled with a hardenable matrix which embeds the cage and the bar ends. The matrix is preferably a hardenable resin, such as epoxy, or a grout which embeds not only the cage but the bar ends. The enhanced performance of the splice is achieved in part by the clamp or set screws, but also by the matrix embedding the cage and bar ends within the sleeve.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

FIG. 3 is a side elevation of the splice for a horizontal bar connection;

FIG. 4 is an axial section of an enhanced splice with the cage and bar ends enclosed in a sleeve;

FIG. 5 is a top plan view of the sleeve seen in FIG. 4;

FIG. 6 is a transaxial section taken substantially from the line 6—6 of FIG. 4;

FIG. 7 is an axial elevation of a cage, sleeve and bar end for joining relatively small reinforcing bar;

FIG. 8 is a similar elevation for somewhat larger bar and also showing somewhat larger bar in the cage opposite and symmetrical with the set or clamp screw axis;

FIG. 9 is a similar elevation for even larger bar;

FIG. 10 is a similar elevation of a larger cage and sleeve;

FIG. 11 is a side elevation of the sleeve of FIG. 10;

FIG. 12 is an axial elevation of a yet larger cage and sleeve;

FIG. 13 is a side elevation of the sleeve of FIG. 12;

FIG. 14 is a section through the bar showing an end elevation of an enhanced splice using a cage in a generally square tubular sleeve;

DETAILED DESCRIPTION OF THE PREFERRED EMBODIMENTS

Figure 1:
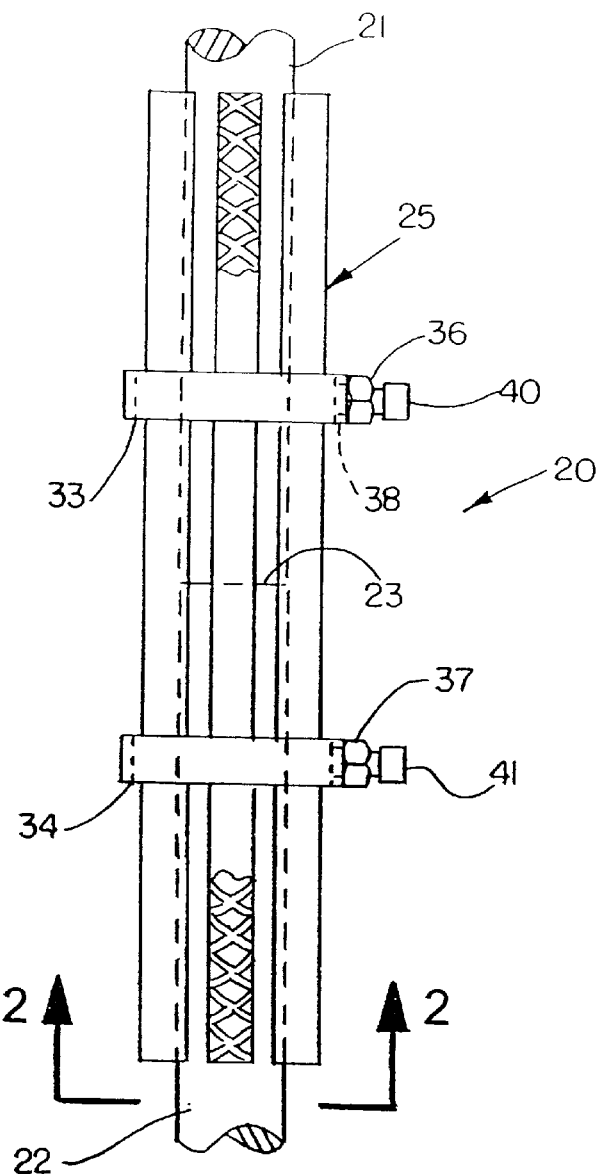
FIG. 1 is a side elevation of a vertical bar splice in accordance with the present invention.
Figure 2:
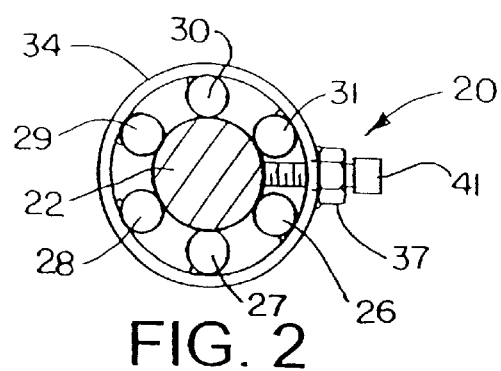
FIG. 2 is a horizontal section through the lower bar as seen from the line 2—2 of FIG. 1.

Referring initially to FIGS. 1 and 2, there is illustrated a vertical or column splice shown generally at 20 for joining two aligned reinforcing bars 21 and 22. The bars butt against each other as indicated at 23, at about the midpoint of the splice.

The splice comprises a generally circular cylindrical cage of somewhat smaller bars indicated at 25. The bars bridge the butt joint 23 and extend approximately equal lengths along the outside of the bar ends. As illustrated more clearly in FIG. 2, there are six smaller bars forming the cage shown at 26, 27, 28, 29, 30 and 31. The bars are generally equally circumferentially spaced around the butted bar ends and are held in such position by rings 33 and 34. The rings may be tack-welded to the bars of the cage to maintain the spacing of the bars and their general parallel axial alignment. Each ring has a nut welded to the exterior as seen at 36 and 37, and each nut is aligned with a hole 38 in the ring. A set or clamp screw indicated at 40 and 41, respectively, is threaded through each nut and extends through the corresponding hole in the ring. The screws may have pointed tips which bite into the bar ends 21 and 22 holding the cage to the bar ends and the bar ends in the cage. The clamp or set screws 40 and 41 may have twist-off heads which limit the tightening of the screws and also provide better lateral clearance.

The bars being joined shown at 20 and 21 require no end preparation and are preferably deformed reinforcing bars having surface irregularities such as seen in FIG. 4.

The bars 26–31 of the cage may also be deformed reinforcing bars as partially illustrated in FIG. 1, but of smaller diameter. It is preferable that the aggregate cross-section area of the smaller bars 26–31 be at least as large as the smaller of the bars being joined. It is also preferable that the arrangement of the bars of the cage be such that at least two bars are positioned symmetrically opposite the axis of the screws as seen at 28 and 29. Alternatively or in addition, the aggregate strength (ultimate rupture strength) of the smaller bars 26–31 may be at least as large as that of the weaker of the bars being joined. Thus, when the screws are tightened the bars being joined will be forced against the opposite symmetrically arranged bars 28 and 29.

When the column splice shown in FIG. 1 is formed, concrete, such as for use in constructing the structure, may be cast directly around the column splice forming the equivalent of a lap-splice, but with considerably less steel and with the bars in axial alignment. If it is desired to join a larger bar on the bottom with a smaller bar on the top, additional screws may be provided on the ring at 33 to center the upper smaller bar in the cage, if axial alignment is desired. If not, the upper smaller bar may simply be pressed against the left-hand side of the cage as seen in FIG. 2 with the axes slightly misaligned, but nonetheless, with the overall diameter of the upper bar within the overall diameter of the lower bar.

Referring now to FIG. 3, there is illustrated a modified form of the vertical splice seen in FIG. 1 which may be used to form the horizontal equivalent of a lap-splice. The bar ends being joined are shown at 43 and 44 and butt in the center of the connection at 45. The cage forming the connection is shown generally at 46 and may comprise a total of six smaller bars with the three on the side of the splice near the viewer being shown at 47, 48 and 49. The bars of the cage will be circumferentially spaced and arranged as in FIG. 2. However, the bars are somewhat longer and instead of two rings there are six rings secured to the bars of the cage as seen at 51, 52, 53, 54, 55 and 56. Each ring is provided with a set screw and nut assembly as seen at 58, 59, 60, 61, 62 and 63 respectively. As in FIG. 1, the screws are axially aligned and press the bar ends, 43 and 44, against symmetrically arranged bars of the cage opposite the screw axes. Other than being longer and having additional rings and screws, the cage 46 is essentially the same as that shown in FIG. 1. When the connection is complete, concrete is cast directly around the connection and the equivalent of a lap-splice is provided with less steel and with joined bars axially aligned.

Referring know to FIGS. 4 through 13, it will be seen that the splice utilizing the cage may be considerably enhanced if the cage is contained within a sleeve and the sleeve is filled with a hardenable matrix such as an epoxy resin or grout.

A simplified form of such sleeve is seen at 65 in FIGS. 4, 5 and 6. The sleeve is preferably steel of substantial thickness and the sleeve itself will contribute to the strength of the splice. The sleeve 65 is provided with four aligned nuts indicated at 66, 67, 68 and 69 as well as two ports seen at 70 and 71 in FIG. 5. The sleeve has a large enough internal diameter to accommodate the bar ends seen at 73 and 74 in FIG. 4 as well as a cage shown generally at 75 in FIG. 6. The nuts 66 through 69 accommodate the set screws seen at 76, 77, 78 and 79, respectively.

As illustrated in FIG. 6, the cage 75 may comprise a total of eight bars with three smaller bars arranged on each side of the axis of the of the set screws while two larger bars seen at 80 and 81 in FIG. 6 are arranged symmetrically opposite the set screws. Thus, when the set screws are tightened, the bar is driven against the symmetrically oppositely arranged larger bars 80 and 81. In order to maintain the parallelism and the spacing of the bars of the cage, they may be connected at each end by a wire shown at 83.

After the screws are tightened as seen in FIGS. 4 and 6, the splice has considerable strength which is achieved by the sleeve, screws and cage. However, to complete the splice or connection, the sleeve ends are closed by caps seen at 85 and 86. These caps may be provided with interior seats seen at 87 which seal against the sleeve ends. The caps provide a fairly close fit around the bars and especially the deformed surface thereof. When the two ends of the sleeve are closed, a hardenable matrix is injected in one of the ports 70 or 71, to fill the sleeve. The air within the sleeve will be vented out through the opposite port and the installer is making the connection will know the sleeve is filled when the hardenable matrix begins to ooze out of the opposite port or the opening of the cap around the bar at the opposite end. The hardenable matrix may be an epoxy resin, for example, or a hardenable grout. An example of such a material is Ciba 4036/RP1500 epoxy. The hardenable matrix may also be a molten metal such as employed in the well known CAD-WELD® reinforcing bar splice sold by Erico, Inc. of Solon, Ohio. If a molten metal is employed, it is preferable that the temperature of the molten metal be less than the fusion temperature of the bar being joined, or the deformed reinforcing bar forming the cage.

When the hardenable matrix solidifies, the caps 85 and 86 are removed and concrete may then be cast around the joint. With the addition of the sleeve and the hardenable matrix, a reinforcing bar connection or splice is provided which will achieve much higher tensile and compressive strengths as well as complete the dynamic tests required to qualify as a Type 2 connection which may be used anywhere in a structure in any of the four earthquake zones of the United States. The high strength splice is, of course, achieved without any bar end preparation.

Referring now to FIG. 8, there is illustrated a splice assembly with a slightly larger sleeve 90 enclosing bar ends 91 and the cage shown generally at 92. Like the cage 75 of FIG. 6, the cage 92 includes a total of eight bars with somewhat smaller bars 93, 94 and 95 being arranged on one side, and smaller bars 96, 97 and 98 being arranged on the opposite side, with larger bars 99 and 100 arranged symmetrically opposite the axis 102 of the set screws. The wire holding the cage together at each end is shown at 103. Although the cage is preferably formed of deformed reinforcing bar such as the bar being joined, it will be appreciated that the two larger bars, 99 and 100 seen in FIG. 8, may be threaded rod. Accordingly, when the set screws are tightened along the axis 102, the bar ends 91 will be driven into the thread forms on the rods 99 and 100, and conversely, the thread forms will be driven into the interior of the sleeve 90. This then assists in locking the bar ends to the cage and the cage in turn to the sleeve.

Referring now to FIG. 7, there is illustrated a somewhat smaller sleeve 105, and a cage of six equal sized bars seen at 106, 107, 108, 109, 110 and 111. The bars of the cage are connected by the wire 112, at each end of the cage, and the two rods, 108 and 109, are arranged symmetrically opposite the axis 113 so that the set screws drive the bar ends 114 against such rods 108 and 109. It will be seen from FIG. 7 that the sleeve and cage is arranged so that bars of varying diameter may be accommodated within the sleeve and that the sleeve and cage does not have to be necessarily concentric with both bars.

FIG. 9 illustrates a somewhat larger sleeve 116, having an eight bar cage shown generally at 117 with all of the bars of essentially the same diameter. However, the two bars, 119 and 120, positioned symmetrically opposite the axis 121 of the set screws are threaded. The bars are joined by the wire 122 to maintain the circumferential spacing. The bar ends being joined shown at 123 are somewhat smaller than the bar size that may be accommodated within the cage and sleeve, and they are not quite concentric with the cage or sleeve.

The use of wires at the ends of the deformed reinforcing bars or threaded rods forming the cage enables the cage to be manufactured on a flat surface to maintain the parallelism and spacing with the wires then coiled to form the generally cylindrical or circular cage. The wires may then be cut, for example, every six or eight bars, depending upon the number of bars in the cage. The wires are sufficiently flexible that the cage formed on a flat surface may be circularized to slip into the sleeve and around the bar ends. The preassembly of the cage in this manner greatly facilitates work site transportation, packaging, and field assembly of the connection or splice.

Referring now to FIGS. 10 and 11, there is illustrated a somewhat larger sleeve 126, which has a cage shown generally at 127 formed of ten bars. The two bars 128 and 129, opposite the axis of the set screws 130, may be somewhat larger. They may also be at a somewhat greater circumferential spacing than the rest of the bars. In any event, the cage comprises a set of four bars symmetrically arranged each side of the set screw axis 130, and the two larger bars 128 and 129 symmetrically arranged opposite the axis. The bar ends being joined are shown at 132. The bars of the cage may be held in their generally parallel arrangement and in their spacing by wires tack-welded to one or both ends, not shown.

As seen in FIG. 11, the sleeve 126 is provided with nuts 134, 135, 136 and 137 on one end, and 138, 139, 140 and 141 on the opposite end. These nuts are actually aligned on the axis 130 and each accommodates a set screw, not shown, for driving the bar ends 132 against the rods 128 and 129 positioned oppositely. Because of the congestion of nuts along the sleeve, the ports for filling the sleeve with the hardenable matrix may be circumferentially offset.

Referring now to FIGS. 12 and 13, there is illustrated a somewhat larger sleeve 144, having a cage shown generally at 145 which includes twelve separate cage bars, again with the two bars 146 and 147 opposite the set screw axis 148 being somewhat larger. The bar ends connected are shown at 149. The cage illustrated in FIG. 12 has a set of five smaller bars on each side of the axis 148 and the two larger bars, 146 and 147, symmetrically opposite the axis. The cage thus includes a total of twelve bars and again they may be connected by wires tack-welded to one or both ends of the cage to facilitate fabrication, field transportation, packaging, and field installation.

As seen in FIG. 13, the sleeve is provided with nuts 151, 152, 153, 154, 155 and 156 on one end, and nuts 157, 158, 159, 160, 161, and 162 on the opposite end. These nuts are aligned on the axis 148 and each accommodates a set screw for clamping the rod ends 149 within the sleeve against the opposite side of the cage or the symmetrically arranged bars 146 and 147. Here again, the hardenable matrix ports may be offset.

Referring now to FIG. 14, it will be seen that while most of the embodiments of the present invention utilize either no sleeve or a sleeve which is circular in section, it will be appreciated that a square or rectangular tube form of sleeve may be used as shown at 165 in FIG. 14. The square tube 165 accommodates a cage shown generally at 166 and accommodates nuts 167 which in turn accommodate set screws 168. The set screws again may be of the twist-off head variety. The set screws drive the bar end 169 being joined against somewhat larger bars 170 and 171 of the cage which are positioned symmetrically opposite the axis of the set screws. The larger bars 170 and 171 nest into the corners of the square tube or sleeve. The other bars of the cage may be somewhat smaller as indicated at 173 to fit between the sidewall of the tube and the bar end. In the upper corners of the tube, the bars 174 and 175 of the cage may be somewhat larger in the accommodating corner.

Figure 15:
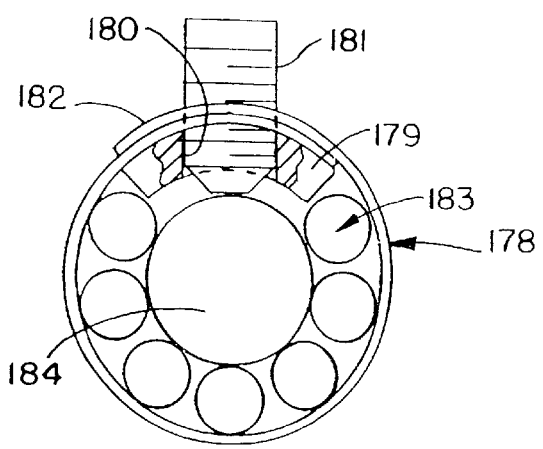
FIG. 15 is an axial elevation of an embodiment using a sheet metal wrapped overlapping sleeve with a nut bar welded on the inside of the sleeve.

In FIG. 15, there is illustrated an embodiment of the invention where the sleeve 178 is formed of wrapped sheet metal. One edge of the sheet metal on the interior has welded thereto a nut bar shown generally at 179 having threaded openings at 180 accommodating set screws 181. The opposite edge of the sleeve shown at 182 is simply wrapped over the one edge and held in place by the insertion of the set screws. The two edges of the sleeve have aligned openings in the wrapped condition to enable the set screws to be inserted. The cage shown generally at 183 comprises seven bars of equal size, equally spaced. The bars may be held in their position shown by being tack-welded to the sheet metal sleeve wrap or they may be inserted separately and preassembled with the wire at one or both ends. With the set screws in place bearing against the bar ends 184, the ends of the wrapped sleeve are closed and filled with a hardenable matrix.

Figure 16:
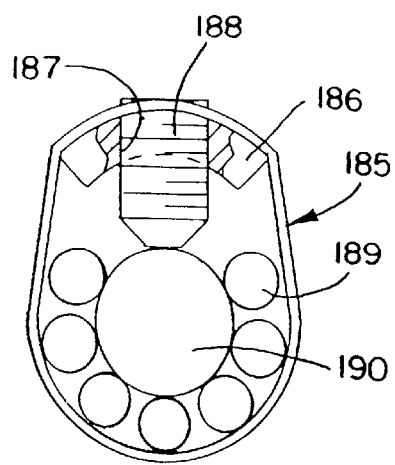
FIG. 16 is an axial elevation of an embodiment after the set screws are tightened forming the sleeve into a generally pear-shape configuration.

FIG. 16 illustrates another form of sheet metal sleeve indicated generally at 185 which includes an arcuate nut bar 186 secured to the interior of the sheet metal. A nut bar is provided with threaded openings 187, accommodating set screws 188. The cage shown generally at 189 includes seven bars arranged symmetrically opposite the set screws and as the set screws are tightened against the bar ends 190 being joined, the sleeve assumes the generally pear-shaped configuration shown. In both embodiments shown in FIGS. 15 and 16, the sleeve is filled with the hardenable matrix to form the high strength joint indicated.

It can now be seen that there is provided a bar splice for steel reinforced concrete construction utilizing a cage of relatively short reinforcing bars which may be of smaller size than the bars to be joined. The bars of the cage are secured together and arranged in a circular cylindrical fashion with a generally axial center opening designed to receive the substantially axially aligned bar ends to be joined. The bars of the cage may be joined in a parallel circumferentially spaced cylinder arrangement by one or more rings or wires and the cage is clamped to the bar ends by clamp or set screws threaded in nuts secured to the rings. The bar end is clamped between the set or clamp screw tips and the opposite side of the cage. The splice may be used for both horizontal and vertical or column joints. When the concrete is poured it embeds the cage and axially aligned bar ends locking the bars axially end-to-end.

In a modified or enhanced version of the splice, the cage is enclosed in a sleeve and the set or clamp screws are threaded through nuts or nut bars on the sleeve to clamp the bar ends against the inside of the cage which bridges or laps the bar ends. Before concrete is cast around the joint, the sleeve is filled with a hardenable matrix which embeds the cage and the bar ends. The matrix is preferably a hardenable resin, such as epoxy, or a grout which embeds not only the cage but the bar ends. The enhanced performance of the splice is achieved in part by the clamp or set screws, but also by the matrix embedding the cage and bar ends within the sleeve. Concrete used to build the structure is then cast around the splice.

Although the invention has been shown and described with respect to certain preferred embodiments, it is obvious that equivalent alterations and modifications will occur to others skilled in the art upon the reading and understanding of this specification. Features described above with regard to one embodiment may be combined with features of the other embodiments. The present invention includes all such equivalent alterations and modifications, and is limited only be the scope of the claims.

What is claimed is:

1. A reinforcing bar splice for concrete construction comprising:
    a cage of parallel relatively short bars circumferentially arranged and forming a generally circular axial opening,
    means to secure said cage to an end of one reinforcing bar that would project partially into one end of said opening, and
    means to secure said cage to an end of another reinforcing bar that would be inserted into the opposite end of said opening,
    whereby, when concrete is poured around said cage said one and another bar will be joined end-to-end,
    wherein both said means to secure are configured to protrude radially into said opening.

2. A reinforcing bar splice for concrete construction comprising:
    a cage of parallel relatively short bars circumferentially arranged and forming a generally circular axial opening,
    means to secure said cage to an end of one reinforcing bar that would project partially into one end of said opening, and
    means to secure said cage to an end of another reinforcing bar that would be inserted into the opposite end of said opening,
    whereby, when concrete is poured around said cage said one and another bar will be joined end-to-end, and
    wherein the aggregate cross-section area of the bars of the cage is equal to or greater than the cross-section area of either of the bars joined end-to-end.

3. A reinforcing bar splice for concrete construction comprising:
    a cage of parallel relatively short bars circumferentially arranged and forming a generally circular axial opening,
    means to secure said cage to an end of one reinforcing bar that would project partially into one end of said opening, and
    means to secure said cage to an end of another reinforcing bar that would be inserted into the opposite end of said opening,
    whereby, when concrete is poured around said cage said one and another bar will be joined end-to-end, and
    wherein the aggregate strength of the bars of the cage is equal to or greater than the strength of the weaker of the bars joined end-to-end.

4. A reinforcing bar splice as set forth in claim 1, wherein at least some of the bars of the cage are deformed reinforcing bars.

5. A reinforcing bar splice as set forth in claim 1, wherein each said means to secure comprises a set screw fastener.

6. A reinforcing bar splice as set forth in claim 5, wherein said set screw fastener is threaded in a nut secured to said cage.

7. A reinforcing bar splice as set forth in claim 6, wherein said nut is secured to a ring in turn secured to each bar of the cage.

8. A reinforcing bar splice as set forth in claim 7, including a plurality of rings spaced axially of said cage.

9. A reinforcing bar splice as set forth in claim 8, including a nut and set screw for each ring.

10. A reinforcing bar splice for concrete construction comprising:
    a cage of parallel relatively short bars circumferentially arranged and forming a generally circular axial opening,
    means to secure said cage to an end of one reinforcing bar that would project partially into one end of said opening, and
    means to secure said cage to an end of another reinforcing bar that would be inserted into the opposite end of said opening,
    whereby, when concrete is poured around said cage said one and another bar will be joined end-to-end,
    wherein each said means to secure comprises a set screw fastener, and
    wherein said set screw is directed generally radially of said cage opening to clamp said one or said another of said reinforcing bars against the inside of said cage.

11. A reinforcing bar splice as set forth in claim 8, wherein said rings circumscribe the cage and are secured to each bar of the cage to maintain the bars of the cage in generally parallel relationship.

12. A reinforcing bar splice for concrete construction comprising:
    a cage of parallel relatively short bars circumferentially arranged and forming a generally circular axial opening,
    means to secure said cage to an end of one reinforcing bar that would project partially into one end of said opening, and
    means to secure said cage to an end of another reinforcing bar that would be inserted into the opposite end of said opening,
    whereby, when concrete is poured around said cage said one and another bar will be joined end-to-end,
    wherein each said means to secure comprises a set screw fastener, and wherein said cage is enclosed in a sleeve, and said set screw is threaded in said sleeve.

13. A reinforcing bar splice as set forth in claim 12, wherein said cage is symmetrically arranged around said one and another bar ends on each side of said set screw.

14. A reinforcing bar splice as set forth in claim 13, wherein said cage includes symmetrically arranged bars opposite said set screw against which said set screw clamps said one or another reinforcing bar.

15. A reinforcing bar splice as set forth in claim 14, wherein said symmetrically arranged bars are threaded rod.

16. A reinforcing bar splice as set forth in claim 15, wherein said symmetrically arranged bars are larger in size than the other bars in the cage.

17. A reinforcing bar splice as set forth in claim 15, including a plurality of set screws opposite said symmetrically arranged bars to engage and clamp said one and another reinforcing bar against said symmetrically arranged bars of the cage.

18. A reinforcing bar splice as set forth in claim 12, including a hardenable matrix filling said sleeve and embedding said cage and said one and another reinforcing bar ends.

19. A reinforcing bar splice as set forth in claim 18, wherein said hardenable matrix is a resin.

20. A reinforcing bar splice as set forth in claim 18, wherein said hardenable matrix is a grout.

21. A reinforcing bar splice as set forth in claim 12, wherein at least some of the bars of the cage are deformed reinforcing bars.

22. A butt splice for concrete reinforcing bar comprising end portions of one and another reinforcing bar arranged end-to-end, a sleeve surrounding said end portions, a cage of bars within said sleeve extending substantially the length of the sleeve and substantially surrounding said end portions within the sleeve, and a hardenable matrix filling said sleeve in which said cage is embedded to lock said bars together in said butt splice.

23. A butt splice as set forth in claim 22, wherein each bar of said cage is connected to maintain the bar spacing of the cage.

24. A butt splice as set forth in claim 23, wherein each bar of the cage is connected by a flexible wire welded to an end of each bar of the cage.

25. A butt splice as set forth in claim 22, wherein said hardenable matrix is a resin.

26. A butt splice as set forth in claim 22, wherein said hardenable matrix is a grout.

27. A butt splice as set forth in claim 22, including set screws threaded in said sleeve locking and clamping said end portions of said one and another reinforcing bar to the cage prior to the filling of said sleeve.

28. A butt splice as set forth in claim 27, wherein said cage is symmetrically arranged around said one and another bar ends on each side of said set screw.

29. A butt splice as set forth in claim 28, wherein said cage includes symmetrically arranged bars opposite said set screw against which said set screw clamps said one or another reinforcing bar.

30. A butt splice as set forth in claim 29, wherein said symmetrically arranged bars are threaded rod.

31. A butt splice as set forth in claim 30, wherein said symmetrically arranged bars are larger in size than the other bars in the cage.

32. A butt splice as set forth in claim 31, including a plurality of set screws opposite said symmetrically arranged bars to engage and clamp said one and another reinforcing bar against said symmetrically arranged bars of the cage.

33. A butt splice as set forth in claim 27, wherein said set screws are threaded in nuts secured to the outside of said sleeve.

34. A butt splice as set forth in claim 27, wherein said set screws are threaded in a nut bar secured to the inside of said sleeve.

35. A butt splice as set forth in claim 22, wherein said sleeve is formed of sheet metal with overlapping edges.

36. A butt splice as set forth in claim 22, wherein said sleeve is generally circular in section.

37. A butt splice as set forth in claim 22, wherein said sleeve is generally square in section.

38. A butt splice as set forth in claim 22, wherein said sleeve in generally pear-shape in section.

39. A butt splice as set forth in claim 22, wherein at least some of the bars of the cage are deformed reinforcing bars.

40. A method of forming a steel reinforcing bar splice in steel reinforced concrete construction comprising the steps of forming a generally cylindrical cage of bars having a central axial opening, securing said cage to an end of one reinforcing bar to be joined, said end partially projecting into said central axial opening, inserting an end of another reinforcing bar to be joined in the opposite end of said central axial opening so that said cage bridges and laps the two bar ends, and then casting concrete around the cage and bar ends.

41. A method as set forth in claim 40, including the step of enclosing the cage in a sleeve, and filling the sleeve with a hardenable matrix before casting the concrete.

42. A method as set forth in claim 41, including the step of clamping said one and another bar ends to the cage before inserting the hardenable matrix.

43. A method as set forth in claim 42, wherein said step of clamping is obtained by set screws biting to said one and another bar ends.

44. A method as set forth in claim 43, including the step of arranging said cage so that two bars of the cage are positioned opposite and symmetrically of the set screws.

45. A method as set forth in claim 44, wherein said two bars are larger than the other bars of the cage.

46. A method as set forth in claim 44, including the step of threading said two bars.

47. A method as set forth in claim 40, including the step of connecting each of the bars of the cage to maintain the bars of the cage generally parallel.

48. A reinforcing bar splice for concrete construction comprising:
    a cage of bars circumferentially arranged and forming an opening therewithin;
    a first fastener configured to secure the cage to an end of one reinforcing bar that would project partially into one end of the opening; and
    a second fastener configured to secure the cage to an end of another reinforcing bar that would be project partially into an opposite end of said opening;
    wherein the aggregate cross-section area of the bars of the cage is equal to or greater than the cross-section area of either of the reinforcing bars.

49. A reinforcing bar splice as set forth in claim 48, wherein the bars of the cage are substantially parallel to one another.

50. A reinforcing bar splice as set forth in claim 48, wherein the first fastener includes a first set screw, and wherein the second fastener includes a second set screw.

51. A reinforcing bar splice as set forth in claim 50, wherein the set screws are threaded in respective nuts secured to the cage.

52. A reinforcing bar splice as set forth in claim 51, wherein the nuts are secured to respective rings that are in turn secured to each bar of the cage.

53. A reinforcing bar splice as set forth in claim 50, wherein the set screws are directed generally radially of the cage opening to clamp the one or the another of the reinforcing bars against the cage.

54. A reinforcing bar splice as set forth in claim 48, wherein some of the bars of the cage have a larger cross-sectional area than other of the bars of the cage.

55. A reinforcing bar splice as set forth in claim 48,
wherein the bars of the cage include a pair of bars located opposite the fasteners, and
wherein the pair of bars are substantially symmetrically located about axes of the fasteners.

56. A reinforcing bar splice as set forth in claim 48, wherein at least some of the bars of the cage include a textured surface.

57. A reinforcing bar splice for concrete construction comprising:
a cage of bars circumferentially arranged and forming an opening therewithin;
a first fastener configured to secure the cage to an end of one reinforcing bar that would project partially into one end of the opening; and
a second fastener configured to secure the cage to an end of another reinforcing bar that would project partially into an opposite end of said opening;
wherein the aggregate strength of the bars of the cage is equal to or greater than the strength of the weaker of the reinforcing bars.

58. A reinforcing bar splice as set forth in claim 57, wherein the bars of the cage are substantially parallel to one another.

59. A reinforcing bar splice as set forth in claim 57, wherein the first fastener includes a first set screw, and wherein the second fastener includes a second set screw.

60. A reinforcing bar splice as set forth in claim 59, wherein the set screws are threaded in respective nuts secured to the cage.

61. A reinforcing bar splice as set forth in claim 60, wherein the nuts are secured to respective rings that are in turn secured to each bar of the cage.

62. A reinforcing bar splice as set forth in claim 59, wherein the set screws are directed generally radially of the cage opening to clamp the one or the another of the reinforcing bars against the cage.

63. A reinforcing bar splice as set forth in claim 57, wherein some of the bars of the cage have a larger cross-sectional area than other of the bars of the cage.

64. A reinforcing bar splice as set forth in claim 57,
wherein the bars of the cage include a pair of bars located opposite the fasteners, and
wherein the pair of bars are substantially symmetrically located about axes of the fasteners.

65. A reinforcing bar splice as set forth in claim 57, wherein at least some of the bars of the cage include a textured surface.

66. A reinforcing bar splice for concrete construction comprising:
a cage of bars circumferentially arranged and forming an axial opening therewithin;
a first threaded fastener coupled to the cage and configured to project radially into the opening, to secure the cage to an end of one reinforcing bar that would project partially into one end of the opening; and
a second threaded fastener coupled to the cage and configured to project radially into the opening, to secure the cage to an end of another reinforcing bar that would project partially into an opposite end of said opening.

67. A reinforcing bar splice as set forth in claim 66, wherein the bars of the cage are substantially parallel to one another.

68. A reinforcing bar splice as set forth in claim 66, wherein the aggregate cross-section area of the bars of the cage is equal to or greater than the cross-section area of either of the reinforcing bars.

69. A reinforcing bar splice as set forth in claim 66, wherein the aggregate strength of the bars of the cage is equal to or greater than the strength of the weaker of the reinforcing bars.

70. A reinforcing bar splice as set forth in claim 66,
wherein the bars of the cage include a pair of bars located opposite the fasteners, and
wherein the pair of bars are substantially symmetrically located about axes of the fasteners.

71. A reinforcing bar splice as set forth in claim 66, wherein at least some of the bars of the cage include a textured surface.

72. A reinforcing bar splice as set forth in claim 71, wherein the textured surface is a threaded surface.

73. A reinforcing bar splice as set forth in claim 71, wherein the at least some of the bars include deformed reinforcing bars each having a smaller cross-section than the reinforcing bars to be joined.

74. A reinforcing bar splice as set forth in claim 66, wherein some of the bars of the cage have a larger cross-sectional area than other of the bars of the cage.

* * * * *